(12) United States Patent
Inagawa et al.

(10) Patent No.: US 10,839,584 B2
(45) Date of Patent: Nov. 17, 2020

(54) SYSTEM, METHOD, AND PROGRAM FOR MANAGING EVALUATION OF AVATAR IMAGES

(71) Applicant: DeNA Co., Ltd., Tokyo (JP)

(72) Inventors: Masatoshi Inagawa, Tokyo (JP); Masayuki Nakano, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 120 days.

(21) Appl. No.: 16/192,579

(22) Filed: Nov. 15, 2018

(65) Prior Publication Data

US 2019/0147635 A1    May 16, 2019

(30) Foreign Application Priority Data

Nov. 16, 2017    (JP) .................. 2017-221374

(51) Int. Cl.
| | | |
|---|---|---|
| G06K 9/00 | (2006.01) | |
| G06T 13/40 | (2011.01) | |
| H04L 12/58 | (2006.01) | |
| G06Q 30/06 | (2012.01) | |
| G06Q 50/00 | (2012.01) | |

(52) U.S. Cl.
CPC ......... *G06T 13/40* (2013.01); *G06Q 30/0643* (2013.01); *H04L 51/32* (2013.01); *G06Q 50/01* (2013.01)

(58) Field of Classification Search
CPC ....... G06T 13/00; G06T 13/20; G06T 13/205; G06T 13/40; G06T 13/60; G06T 13/80; G06T 15/00; G06T 15/005; G06T 15/02; G06T 15/04; G06T 15/06; G06T 15/08; G06T 15/10; G06T 15/20; G06T 15/205; G06T 19/00; G06T 19/003; G06T 19/006; G06T 19/20; G06T 2200/00; G06T 2200/04; G06T 2200/08; G06T 2200/12; G06T 2200/16; G06T 2200/21; G06T 2200/24; G06T 2200/28; G06T 2200/32; G06Q 30/0643; G06Q 50/01; H04L 51/32
USPC ........................................................ 382/170
See application file for complete search history.

(56) References Cited

U.S. PATENT DOCUMENTS

2007/0176921 A1* 8/2007 Iwasaki ............... A63F 13/60
                                                         345/419
2017/0053186 A1* 2/2017 Allen ................. G06K 9/00302

FOREIGN PATENT DOCUMENTS

JP         2016-010626 A    1/2016

* cited by examiner

*Primary Examiner* — Huy C Ho
(74) *Attorney, Agent, or Firm* — Procopio, Cory, Hargreaves & Savitch LLP

(57) ABSTRACT

A contest providing system 10 according to an embodiment of the present invention has a function of providing a user of a user terminal 30 with a contest for an avatar image, and managing the evaluation of avatar images in this contest. This system 10 accepts the evaluation of the registered avatar image, while providing an avatar stamp corresponding to the avatar image on the basis of at least this evaluation. Therefore, even after the end of the contest in which the evaluation of the avatar image is performed, the user can continue to enjoy using the corresponding avatar stamp provided on the basis of the evaluation.

10 Claims, 14 Drawing Sheets

Avatar image management table 411

| Avatar image ID |
| User ID |
| Set item information |
| Input text string information |
| Likes count |
| Number of SNS posts |
| Avatar image points |
| ... |

Item management table 412

| Item ID |
| --- |
| Likes count |
| Settings count |
| Item points |
| Not-for-sale flag |
| Number of sale requests |
| *** |

| | Official | Custom | Top ranking |
|---|---|---|---|
| Registration period | ○ | - | - |
| Voting period | ○ | ○ | - |
| Result announcement period | ○ | ○ | ○ |

SYSTEM, METHOD, AND PROGRAM FOR MANAGING EVALUATION OF AVATAR IMAGES

This application claims foreign priority under 35 USC 119 based on Japanese Patent Application No. 2017-221374, filed on Nov. 16, 2017, the contents of which is incorporated herein in its entirety by reference.

BACKGROUND

1. Field

The present invention relates to a system, a method, and a program (e.g., non-transitory computer-readable medium including instructions to be performed on a processor) for managing the evaluation of avatar images.

2. Related Art

A system for providing a contest in which avatar images compete for popularity has been proposed in the past. For example, the following Patent Document 1 discloses a system for providing a contest in which entries of images (seals) produced on the basis of avatar images are accepted, and users are ranked according to the results of voting for the entered seals. With this system, benefits (such as items and other such prizes) are awarded to the users according to the ranking in the contest.

PRIOR ART DOCUMENT

Patent Documents

[Patent Document 1]: Japanese Patent Application 2016-010626

SUMMARY

Problems to be Solved by the Invention

With the conventional contest described above, however, although the user can enjoy acquiring benefits according to the voting results for the entered images, the entered image itself ends up not being used once the contest is over. If an entered image could continue to be used, this would increase the value of the image, and would probably also lead to making the contest itself more popular. In view of this, in a system that provides contests and so forth in which avatar images are evaluated, it is desirable to find some way to promote the continued use of registered avatar images.

One object of an embodiment of the present invention is to promote the continued use of avatar images registered in contests or the like. Other objects of embodiments of the present invention will become apparent by referring to the Specification in its entirety.

Means for Solving the Problems

The system according to an embodiment of the present invention comprises one or more computer processors, and is a system for managing the evaluation of avatar images, wherein, in response to the execution of a readable command, the one or more computer processors execute processing to accept registration of an avatar image, processing to accept evaluation of a registered avatar image, and processing to provide an avatar image object that can be used as a message in a specific communication and that corresponds to the registered avatar image, and the processing to provide the avatar image object includes providing an avatar image object corresponding to the registered avatar image on the basis of at least an evaluation of the registered avatar image.

The method according to an embodiment of the present invention is a method for managing the evaluation of an avatar image, which is executed by one or more computers, said method comprising a step of accepting registration of an avatar image, a step of accepting evaluation of the registered avatar image, and a step of providing an avatar image object that can be used as a message in a specific communication and that corresponds to the registered avatar image, wherein the step of providing the avatar image object includes providing an avatar image object corresponding to the registered avatar image on the basis of at least an evaluation of the registered avatar image.

The program (e.g., non-transitory computer-readable medium including instructions to be performed on a processor) according to an embodiment of the present invention is a program for managing the evaluation of an avatar image, said program being executed by one or more computers and causing the one or more computers to execute processing to accept registration of an avatar image, processing to accept evaluation of the registered avatar image, and processing to provide an avatar image object that can be used as a message in a specific communication and that corresponds to the registered avatar image, wherein the processing to provide the avatar image object includes providing an avatar image object corresponding to the registered avatar image on the basis of at least an evaluation of the registered avatar image.

Effects of the Invention

Various embodiments of the present invention promote the continued use of avatar images registered in a contest or the like.

DETAILED DESCRIPTION

Embodiments of the present invention will now be described through reference to the drawings.

Figure 1:
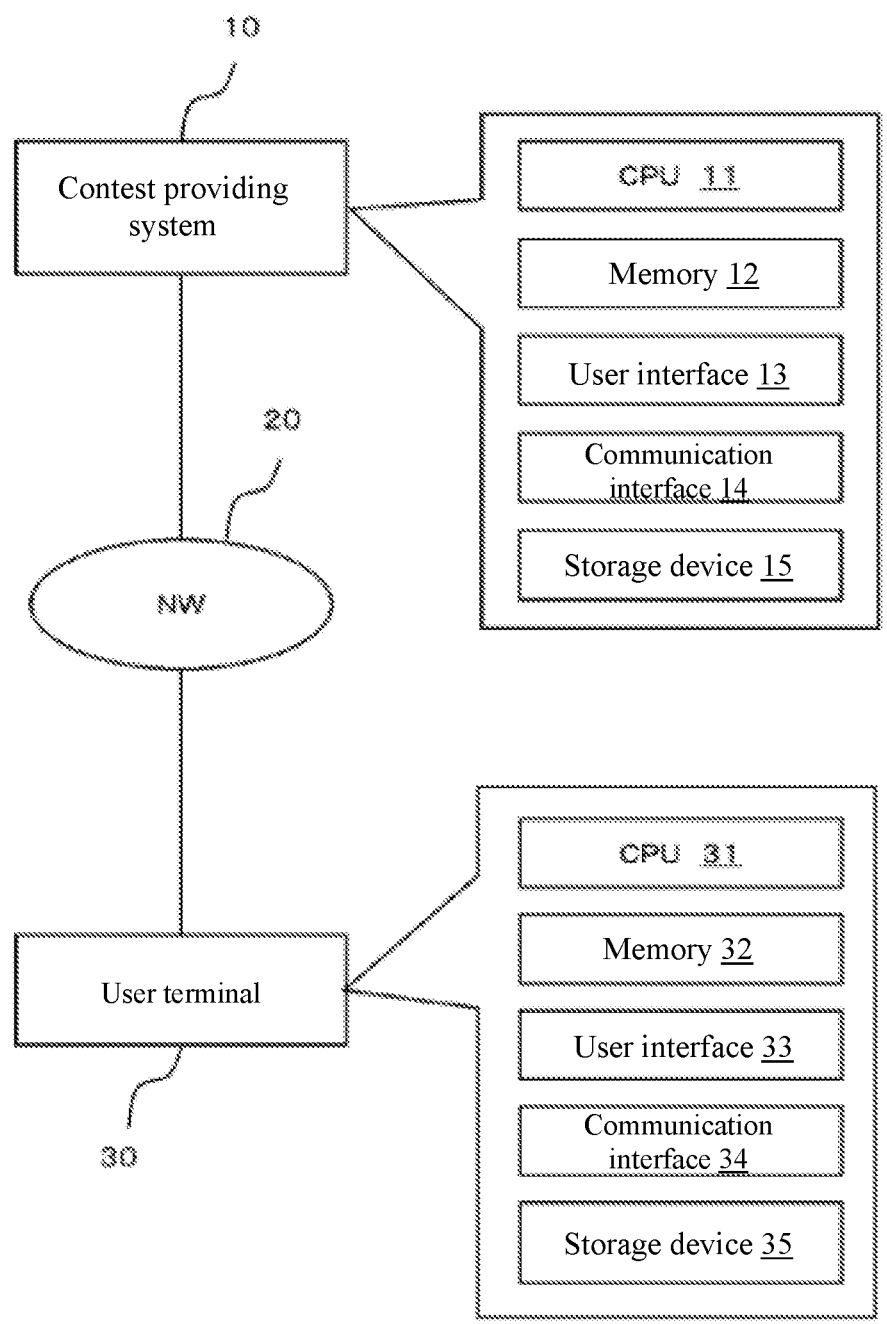
FIG. 1 illustrates a simplified diagram of the configuration of a network including a contest providing system 10 according to an embodiment of the present invention.

FIG. 1 is a simplified diagram of the configuration of a network including a contest providing system 10 according to an embodiment of the present invention. As shown in FIG. 1, the system 10 is communicably connected to a user terminal 30 via a network 20 such as the Internet. Only one user terminal 30 is shown in FIG. 1, but the system 10 is communicably connected to a plurality of user terminals 30. The system 10 has a function of providing an avatar image contest to the users of the user terminals 30 and managing the evaluation of the avatar images in that contest.

The system 10 is configured as an ordinary computer, and as shown in FIG. 1, comprises a CPU (computer processor) 11, a main memory 12, a user interface 13, a communication interface 14, and a storage device 15, with these constituent elements being electrically connected via a bus (not shown) or the like.

The CPU 11 reads various programs (e.g., non-transitory computer-readable medium including instructions to be performed on a processor) stored in the storage device 15 or the like into the main memory 12, and executes various commands included in the program. The main memory 12 is constituted by a DRAM or the like, for example.

The user interface 13 is any of various input/output devices for exchanging information with the user. The user interface 13 includes, for example, an information input device such as a keyboard or a pointing device (such as a mouse or a touch panel), a voice input device such as a microphone, and an image input device such as a camera. The user interface 13 also includes an image output device such as a display, and an audio output device such as a speaker.

The communication interface 14 is made up of hardware such as a network adapter, various communication software, or a combination of these, and is configured to allow wired or wireless communication via the network 20 or the like.

The storage device 15 is constituted by a magnetic disk or a flash memory, for example. The storage device 15 stores various programs (e.g., non-transitory computer-readable medium including instructions to be performed on a processor) including an operating system, various data, and the like.

In this embodiment, the system 10 can be configured using a plurality of computers each having the above-mentioned hardware configuration. For instance, the system 10 can be constituted by a plurality of server devices.

The contest providing system 10 thus configured functions as a web server and an application server, executes various kinds of processing in response to requests from a web browser or other application installed in the user terminal 30, and transmits screen data (such as HTML data), control data, and the like corresponding to the results of this processing to the user terminal 30. At the user terminal 30, a web page or other screen based on the received data is displayed.

The user terminal 30 is configured as an ordinary computer and, as shown in FIG. 1, comprises a CPU (computer processor) 31, a main memory 32, a user interface 33, a communication interface 34, and a storage device 35 with these constituent elements being electrically connected via a bus (not shown) or the like.

The CPU 31 reads various programs (e.g., non-transitory computer-readable medium including instructions to be performed on a processor) stored in the storage device 35 or the like into the main memory 32 and executes the various commands included in the programs. The main memory 32 is constituted by a DRAM or the like, for example.

The user interface 33 is any of various kinds of input/output devices for exchanging information with the user. The user interface 33 includes, for example, an information input device such as a keyboard or a pointing device (such as a mouse or a touch panel), a voice input device such as a microphone, and an image input device such as a camera. The user interface 33 also includes an image output device such as a display, and an audio output device such as a speaker.

The communication interface 34 is made up of hardware such as a network adapter, various communication software, or combinations of these, and is configured to allow wired or wireless communication via the network 20 or the like.

The storage device 35 is constituted by a magnetic disk or a flash memory, for example. The storage device 35 stores various programs (e.g., non-transitory computer-readable medium including instructions to be performed on a processor) including operating systems, various data, and the like. The programs stored in the storage device 35 can be downloaded and installed from an application market or the like.

In this embodiment, the user terminal 30 may be configured as a smartphone, a tablet terminal, a wearable device, a personal computer, a game console, or the like.

Figures 2, 3:
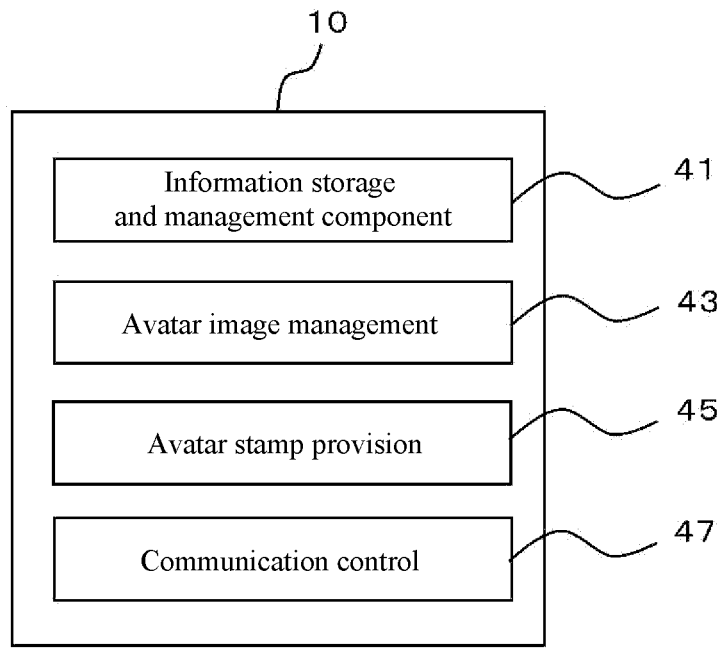
FIG. 2 illustrates a simplified block diagram of the functions of the contest providing system.
FIG. 3 illustrates a diagram showing an example of the information managed in an avatar image management table 411.

Next, the functions of the contest providing system 10 in this embodiment will be described. FIG. 2 is a simplified block diagram showing the functions of the system 10. As shown in the drawing, the system 10 has an information storage and management component 41 that stores and manages various kinds of information, an avatar image manager 43 that executes processing related to the management of avatar images, an avatar stamp provider 45 that executes processing related to the provision of avatar stamps (avatar image objects) corresponding to avatar images, and a communication controller 47 that executes processing related to the control of specific communications performed among a plurality of users. These functions are realized by the cooperative operation of the hardware, such as the CPU 11 and the main memory 12, and the various programs (e.g., non-transitory computer-readable medium including instructions to be performed on a processor), data, and so forth stored in the storage 15 and the like. For example, commands included in the programs read into the main memory 12 are executed by the CPU 11 to realize these functions. Some or all of the functions shown in FIG. 2 may be realized through cooperation between the system 10 and the user terminal 30, or they may be realized by the user terminal 30.

The information storage and management component 41 of the system 10 stores and manages various information in the storage device 15 or the like. The avatar image manager 43 of the system 10 executes various processing related to the management of avatar images. In this embodiment, the avatar image manager 43 is configured to accept the registration of avatar images in a contest. For example, the avatar image manager 43 is configured to accept an avatar image from a user via a screen displayed on the user terminal 30, and to register the accepted avatar image in the storage device 15 or the like.

The avatar image manager 43 is also configured to accept an evaluation of registered avatar images. For example, the avatar image manager 43 is configured to accept an evaluation by another user of an avatar image registered by a specific user, via a screen displayed on the user terminal 30. The evaluation of the avatar images is managed, for example, in the storage device 15 or the like.

The avatar stamp provider 45 of the system 10 executes various processing related to the provision of avatar stamps. In this embodiment, the avatar stamp provider 45 is configured to provide an avatar stamp corresponding to a registered avatar image, on the basis of at least the evaluation of that avatar image. An avatar stamp is a stamp (image object) that can be used as a message in a specific communication controlled by the communication controller 47, and corresponds to the registered avatar image. For example, an avatar stamp corresponding to an avatar image has the same or similar appearance as the avatar image. For instance, possessed stamp information related to a stamp possessed by the user is managed in the storage device 15 or the like, and this possessed stamp information is updated in response to the provision of an avatar stamp by the avatar stamp provider 45.

The communication controller 47 of the system 10 executes various processing related to the control of specific communications. A specific communication consists of messages and the like exchanged among a plurality of users, and may include, for example, text chats, bulletin boards, and so forth.

Thus, the contest providing system 10 in this embodiment accepts the evaluation of registered avatar images, while providing an avatar stamp corresponding to an avatar image on the basis of at least that evaluation. Therefore, even after the end of a contest in which avatar images are evaluated, the user can continue to enjoy the use of the corresponding avatar stamp provided on the basis of that evaluation.

In this embodiment, the avatar image manager 43 can be configured to set the rankings of a plurality of avatar images on the basis of at least the evaluation of the registered avatar images. For example, the avatar image manager 43 calculates a first point for a registered avatar image on the basis of at least the evaluation of the registered avatar image, and sets the ranking of each of the plurality of avatar images registered by a plurality of users on the basis of at least the calculated first point. The set rankings can be presented (for example, displayed on the user terminal 30) to the user in response to a request from the user. This configuration makes it possible to set rankings on the basis of an evaluation of avatar images.

In this embodiment, the avatar stamp provider 45 can be configured to provide a plurality of users (for example, all users to have participated in a contest (who have registered an avatar image), etc.) with avatar stamps corresponding to each of a specific number of top avatar images having higher rankings out of a plurality of registered avatar images. In such a configuration, since avatar stamps corresponding to avatar images having higher rankings are provided to a plurality of users, high-quality stamps can be provided to the users, and this also motivates the users to attain a higher ranking. Also, since the ranking of an avatar image needs to be high in order to obtain an avatar stamp corresponding to that avatar image, users are prompted to participate in the contest (to evaluate the avatar images the users are concerned about) and the contest becomes more popular.

Also, the avatar image manager 43 can be configured to accept evaluations of avatar images only within a specific time period (that is, to set an evaluation period for avatar images), and in this case, the range (type) of avatar stamps provided by the avatar stamp provider 45 during the specific time period may be made different from those after the specific time period. For example, during the specific time period in which evaluations of avatar images are accepted, the avatar stamp provider 45 may provide users with avatar stamps corresponding to the avatar images registered by the users themselves (that is, the avatar stamp provider 45 provides specific users with specific avatar stamps corresponding to the specific avatar images registered by those specific users), but after this specific time period, it may provide each of a plurality of users with avatar stamps corresponding to each of a specific number of top avatar images having the highest rankings (that is, when the specific avatar images are included in a specific number of top avatar images, the specific avatar stamps are also provided to other users). With such a configuration, since an avatar stamp corresponding to an avatar image registered by a user is provided to the user himself during the period of accepting evaluations, the user can use that avatar stamp in a specific communication, so the user's own avatar image can appeal to other users. As a result, the contest can become more popular.

Also, the avatar stamp provider 45 can be configured to provide a specific avatar stamp (such as a stamp prepared by the operator of the contest) to a plurality of users before a specific time period in which evaluations of avatar images are accepted (such as a time period in which the registration of avatar images is accepted). Such a configuration can be expected to promote the contest through the use of this specific avatar stamp in a specific communication, and can prompt many users to register avatar images (to enter the contest).

Also, the avatar image manager 43 can be configured to increase the first point used for setting the rankings, in response to posting to a specific SNS associated with registered avatar images. Such a configuration can be expected to promote the contest and encourage postings associated with the registered avatar images.

In this embodiment, an avatar image can be configured such that one or more items are set for the avatar main body. For example, a screen for accepting an avatar image from a user is configured so that one or more items to be set for the avatar main body can be selected from among a plurality of usable items. In this case, the communication controller 47 can be configured so that a first screen for inputting and displaying a message in a specific communication is presented (is displayed on the user terminal 30, for example), and a second screen for obtaining one or more items set in the avatar image corresponding to the selected avatar stamp is presented (is displayed on the user terminal 30, for example) in response to the selection of the avatar stamp displayed on the first screen as this message. The second screen is, for example, a screen for purchasing items using a virtual shopping cart. Such a configuration allows items to be obtained by means of avatar stamps used in a specific communication.

In this embodiment, the second screen can be configured to allow the input of sale requests for items that are not for sale, out of the one or more items set in the corresponding avatar image. Such a configuration makes it possible for the operator to ascertain the demand for items that are not for sale.

Also, the avatar image manager 43 can be configured to calculate a second point for each of the plurality of items set in the plurality of registered avatar images. For example, the avatar image manager 43 can be configured to calculate a second point for each of a plurality of items on the basis of at least the number of registered avatar images in which each of a plurality of items is set (the settings count of each item for each avatar image). Such a configuration makes it possible, for example, to calculate the popularity of an item as the second point, on the basis of the settings count for that item.

Also, for example, the avatar image manager 43 is configured to calculate the second point for each of a plurality of items on the basis of at least the evaluation of the registered avatar images in which each of the plurality of items is set. For example, the avatar image manager 43 is configured to calculate a first point for a specific avatar image on the basis of the evaluation of the specific avatar image, and a second point for each of the one or more items set for the specific avatar image. Such a configuration makes it possible, for example, to calculate the popularity of an item set for an avatar image as a second point, on the basis of the evaluation of that avatar image.

Also, the avatar image manager 43 can be configured to calculate the first point for a registered avatar image on the basis of the second point for each of one or more items set for that avatar image, in addition to the evaluation of the registered avatar images. Such a configuration makes it more likely that avatar images set with popular items are higher in the rankings, for example. That is, avatar images set with popular items are more readily provided as avatar stamps, so the use of those avatar stamps is stimulated.

Figures 4, 5:
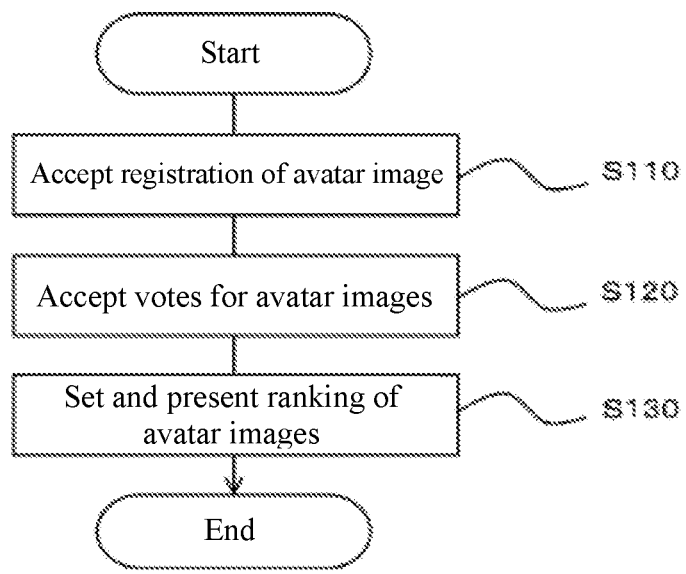
FIG. 4 illustrates a diagram showing an example of the information managed in the item management table 412.
FIG. 5 illustrates a flowchart showing an example of the operation of the contest providing system 10.

Next, a specific example of the contest providing system 10 of this embodiment having such a function will be described. FIGS. 3 and 4 show the information managed in a table stored in the storage device 15 or the like in this specific example. FIG. 3 shows the information managed in an avatar image management table 411 that manages information related to registered avatar images. As shown in the drawing, the avatar image management table 411 manages a "User ID" for identifying a user who has registered an avatar image, "Set item information," which is information related to an item set for that avatar image, "Input text string information," which is information related to the text string inputted for that avatar image, the "Likes count," which is the number of "likes" received by that avatar image, the "Number of SNS posts," which is the number of posts to a specific SNS associated with that avatar image, the "Avatar image points" (first points), and other such information, all of which correspond to an "Avatar image ID" that identifies an individual avatar image that has been registered. The set item information includes one or more item IDs identifying each of the one or more items that have been set. As will be described below in detail, the avatar image points are calculated on the basis of the likes count, the number of SNS posts, and so forth, and is used in the setting of the ranking of avatar images.

FIG. 4 shows the information managed in an item management table 412 that manages information related to items that can be set for an avatar image in this specific example. As shown in the drawing, the item management table 412 manages the "Likes count," which is the total number of "likes" received by a plurality of avatar images for which an individual item is set, the "Settings count," which is the total number of avatar images for which that item has been set, "Item points" (second points), a "Not-for-sale flag" indicating whether or not that item is not for sale, the "Number of sale requests," which is the number of sale requests received when that item is not for sale, and other such information, all of which correspond to an "Item ID" that identifies an avatar image. The item points are calculated on the basis of the likes count, the settings count, and so forth, which will be described below in detail, and represent the degree of popularity of an item.

In this example, the avatar main bodies and items that can be used in the contest are prepared in advance by the operator, and the user makes use of the prepared avatar main bodies and items to create and register an avatar image. The above-mentioned item management table 412 manages information related to items prepared in advance by the operator in this way.

The operation of the contest providing system 10 in a specific example will now be described. FIG. 5 is a flowchart of the operation of the contest providing system 10. First, as shown in the drawing, the contest providing system 10 accepts the registration of an avatar image from a user (step S110). In this example, registration of an avatar image is accepted via the screen displayed on the user terminal 30.

Figure 6:
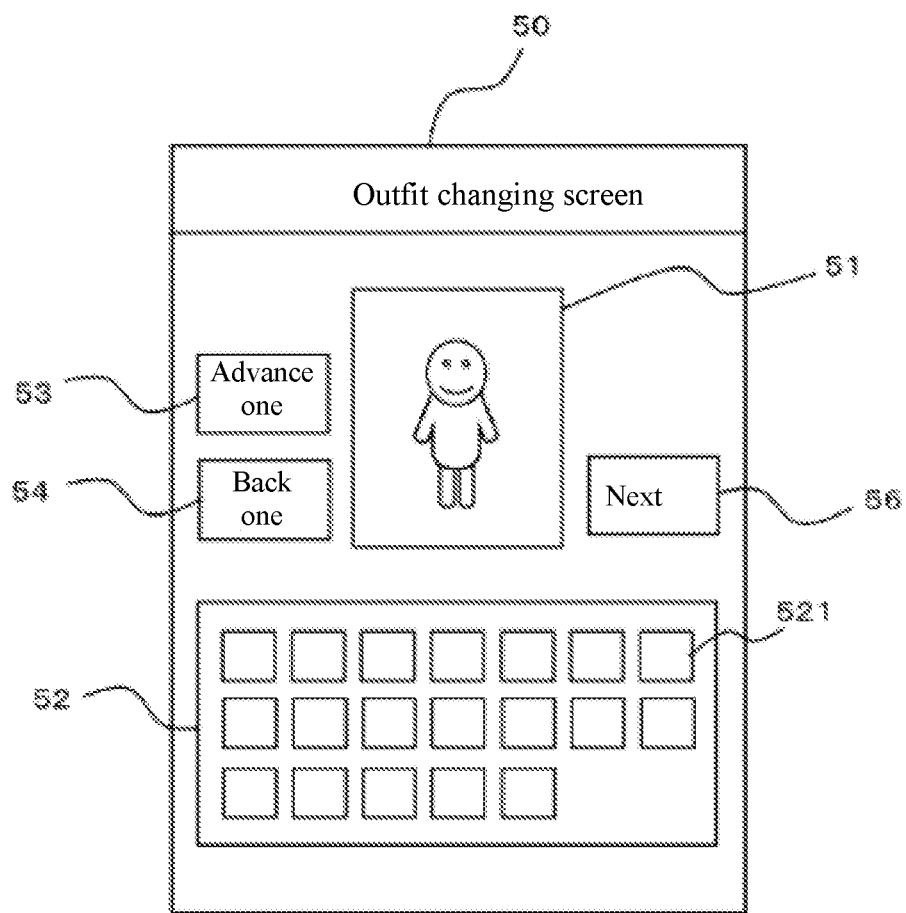
FIG. 6 illustrates a diagram showing an example of an outfit changing screen 50.

FIG. 6 shows an example of an outfit changing screen 50 displayed on the user terminal 30. This screen 50 is used for setting items for the avatar main body, and has, as shown in the drawing, an avatar image display area 51 for displaying the current avatar image, an item manipulation area 52 for performing manipulations related to items, a forward button 53 displayed as "Advance one," a back button 54 displayed as "Back one," and a continue button 56 displayed as "Next."

At first, the avatar image displayed in the avatar image display area 51 is an image of the avatar main body in a state in which none of the items has been set, and in accordance with the setting of an item via the item manipulation area 52, the display changes to an avatar image that reflects the setting of that item.

In the item manipulation area 52, item images 521 corresponding to each of a plurality of items prepared in advance by the operator of the contest (that is, items that can be set for the avatar main body) are arranged in columns and rows. Types of items may include, for example, costumes, hairstyles, accessories, ornaments, motions, and the like. The user can set and cancel the corresponding item for the avatar main body by an operation of selecting one of the plurality of item images 521 arranged in the item manipulation area 52.

The forward button 53 and the back button 54 are buttons for canceling the setting of an item or resetting a canceled item. When the back button 54 is selected, the setting state of the item with respect to the avatar main body returns to its previous state (for example, the setting of the last set item is canceled, or the item whose setting was last canceled is reset), and when the forward button 53 is selected, the setting state of the item with respect to the avatar main body proceeds to one state later (the state just before returning).

Figure 7:
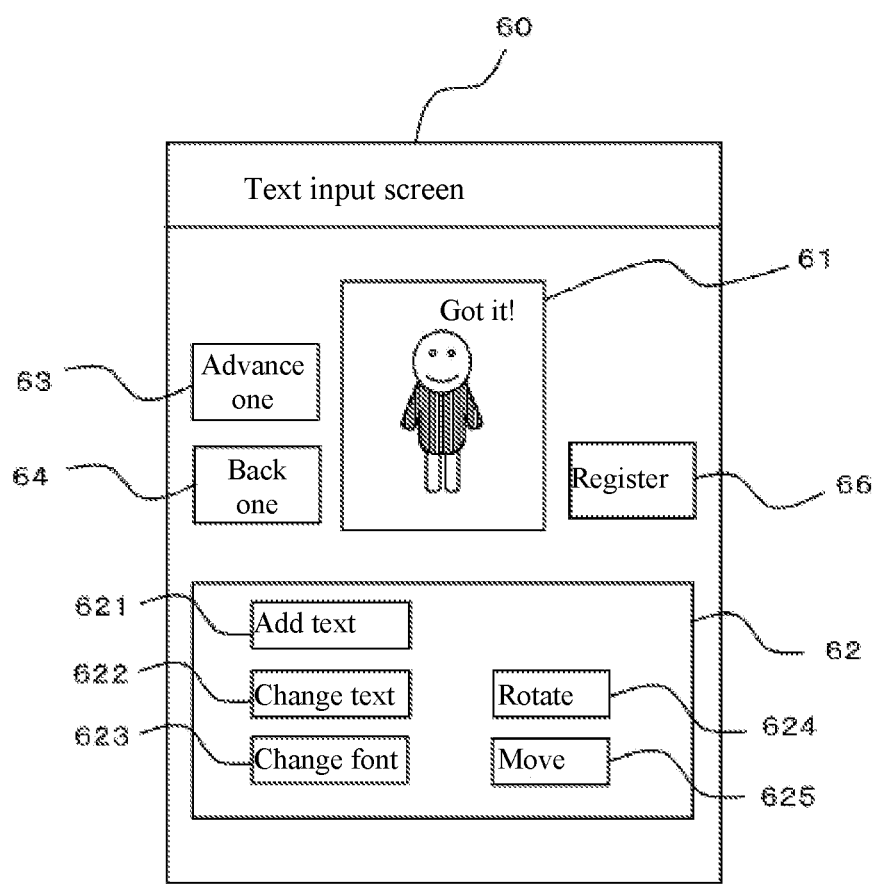
FIG. 7 illustrates a diagram showing an example of a text input screen 60.

When the user selects the continue button 56, the text input screen 60 shown in FIG. 7 is displayed on the user terminal 30. The text input screen 60 is a screen for inputting a text string in an avatar image, and as shown in the drawing, it has an avatar image display area 61 for displaying the current avatar image, a forward button 63 displayed as "Advance one," and a back button 64 displayed as "Back one," similar to the outfit changing screen 50 shown in FIG. 6. Also, this screen 60 has a text input manipulation area 62 for performing manipulations related to text input, and a registration button 66 displayed as "Register."

The text input manipulation area 62 has a text addition button 621 for adding a new text string to an avatar image, a text change button 622 for changing a text string that has already been added, a font change button 623 for changing the font of a text string that has already been added, a rotation button 624 for rotating a text string that has already been added, and a move button 625 for moving a text string that has already been added (for changing its position in an avatar image). The user can use these buttons 621 to 625 to add a text string to an avatar image and edit the added text string. In the example in FIG. 7, the avatar image displayed in the avatar image display area 61 has a text string of "Got it!" added above the avatar main body. It is also possible to add a plurality of text strings to one avatar image. Thus, the avatar image in this example is an image in which the desired text string is inputted to an image in which one or more items have been set for an avatar main body. Also, since the user can freely input text, it is possible to create an avatar image including a message that envisions every usage scenario as a stamp. As a result, it is possible to promote the use of avatars in communications between users (more specifically, the use of avatar stamps corresponding to avatar images).

When the user selects the registration button 66, registration of the avatar image is accepted by the system 10. More specifically, a new record is produced in the avatar image table 411, and values corresponding to the avatar image ID, the user ID, set item information, and input text string information are set. Also, the settings count in the item management table 412 is updated (increased by one) for each of the one or more items set in an avatar image.

In this example, this registration of an avatar image (entry in a contest) is accepted during a registration period (such as a specific week) that has been specified in advance. Returning to the flow chart in FIG. 5, when the registration period ends, the system 10 then accepts votes (evaluations) for registered avatar images (step S120).

Figure 8:
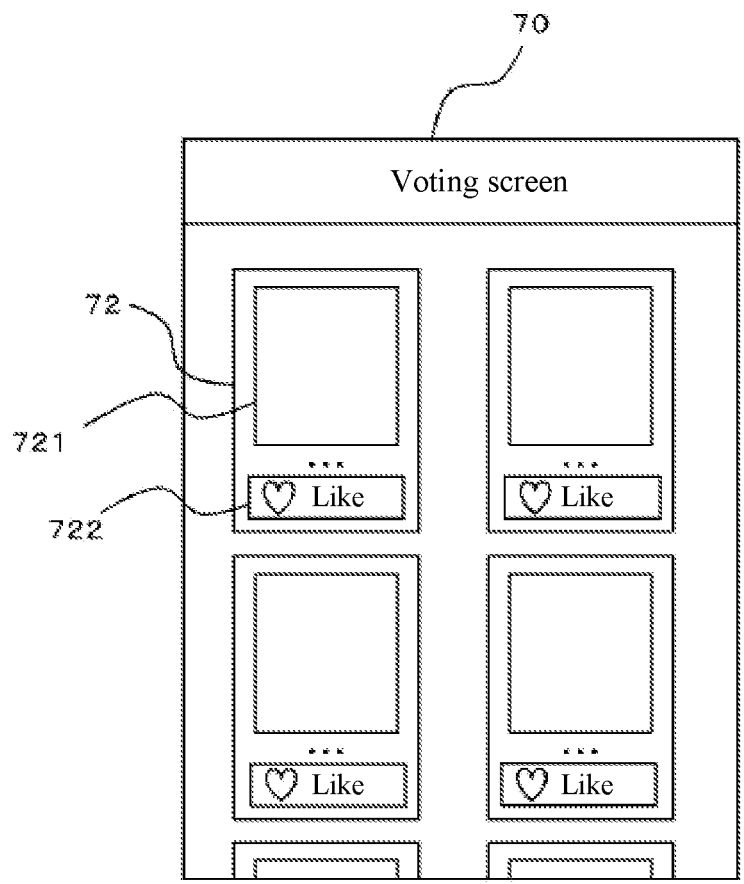
FIG. 8 illustrates a diagram showing an example of a voting screen 70.

FIG. 8 shows an example of a voting screen 70 for voting for an avatar image registered by another user. As shown in the drawing, the voting screen 70 has a plurality of individual display areas 72, each of which individually displays information related to an avatar image, arranged in columns and rows.

The individual display areas 72 each have an avatar image display area 721 in which an avatar image is displayed, and a voting area 722 for inputting a "like" as a vote for an avatar image, and information related to the corresponding avatar image (information related to users who have registered an avatar image, etc.) and the like are displayed. A user can select the heart-shaped object disposed in the voting area 722 to input a "like" for the corresponding avatar image. When a "like" is inputted, the system 10 updates (increases by one) the "Likes count" in the avatar image management table 411 for the corresponding avatar image, and also updates (increases by one) the "Likes count" in the item management table 412 for each of the one or more items that have been set for that avatar image.

Here, in this example, the avatar images displayed on the voting screen 70 are picked out and sorted according to a specific rule from among the plurality of registered avatar images. For example, the system 10 picks out and sorts the avatar images displayed on the voting screen 70 (for example, avatar images with more recent registration dates and times, and avatar images with more "likes" are given priority) on the basis of at least the registration date and time and the "Likes count."

Figure 9:
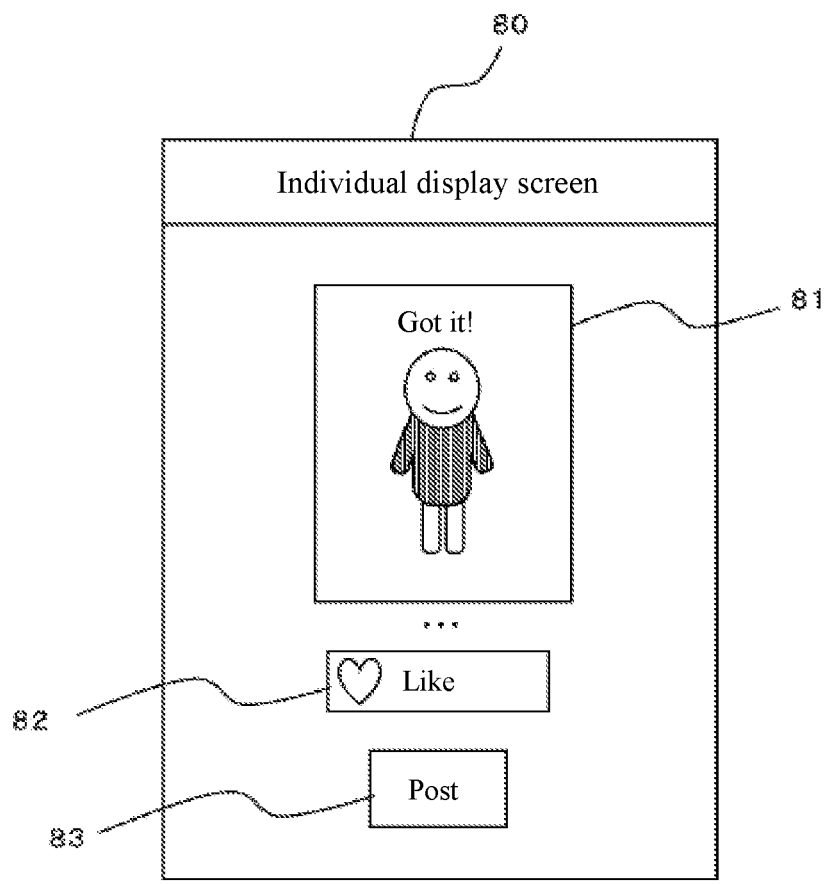
FIG. 9 illustrates a diagram showing an example of an individual display screen 80.

FIG. 9 shows an example of an individual display screen 80 displayed according to the selection of the avatar image display area 721 on the voting screen 70. This screen 80 has an individual display area 81 for enlarged displays of individual avatar images, a voting area 82 for inputting "like" as a vote for an avatar image, and a posting button 83 displayed as "Post." Thus, voting for an avatar image can be performed via the voting area 82 on the individual display screen 80 in addition to the voting screen 70.

The posting button 83 is a button for making a post associated with a corresponding avatar image, to a specific SNS provided by a system other than the system 10. More specifically, when the user selects the button 83, a screen for making a post to a specific SNS is displayed, and the URL of the web page corresponding to the individual display screen 80, for example, is inputted in an area for inputting posting contents on the screen. When the posting button 83 is selected and a post is made to a specific SNS, the system 10 updates (increases by one) the number of SNS posts in the avatar image management table 411 for the corresponding avatar image.

The user can also display the individual display screen 80 displaying the avatar image registered by the user himself on the user terminal 30, without going through the voting screen 70. Therefore, a post to the above-mentioned specific SNS can be made in association with the user's own avatar image.

In this example, votes for avatar images are accepted during a voting period specified in advance (such as a specific week). Returning to the flowchart in FIG. 5, when the voting period ends, the system 10 then sets and presents the ranking of the avatar images (step S130).

In this example, the ranking of the avatar images is set according to the avatar image points in the avatar image management table 411. The points are calculated on the basis of "Likes count," the number of SNS posts, and the item points of the set items. More specifically, the avatar image points, with the "Likes count" as a baseline, are calculated such that the more SNS posts there are and the more item points there are, the more specific addition points are added.

Here, the item points in the item management table 412 are calculated on the basis of the "Likes count" and the settings count. More specifically, the item points, with the "Likes count" as a baseline, are calculated such that the more settings there are, the more specific addition points are added.

Figures 10, 11:
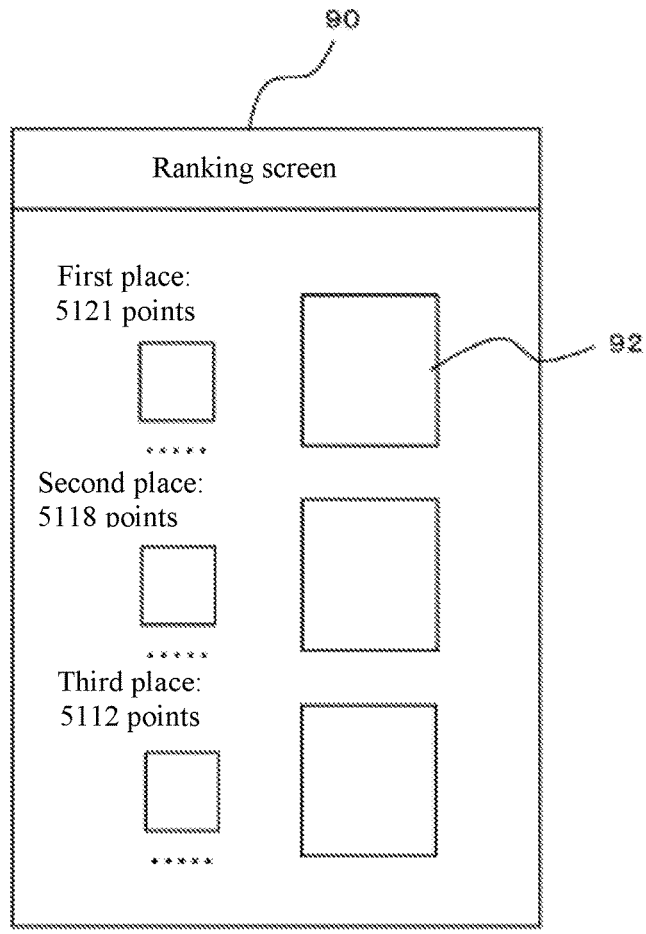
FIG. 10 illustrates a diagram showing an example of a ranking screen 90.
FIG. 11 illustrates a diagram illustrating the correlation between each time period and usable avatar stamps.

FIG. 10 shows an example of a ranking screen 90 on which the rankings of avatar images are displayed. As shown in the drawing, on this screen 90, avatar image display areas 92 in which individual avatar images are displayed are arranged vertically in the order of the set rankings (that is, in descending order of avatar image points). On the left side of an avatar image display area 92, the screen 90 displays the rank of the corresponding avatar image, the avatar image points, an image of the corresponding user (such as a normal avatar image that is different from the avatar image used for the contest), and information related to that user.

In this example, the ranking (voting results) shown on the ranking screen 90 is presented during a result announcement period that has been specified in advance.

The provision of an avatar stamp in this example will now be described. In this example, the range (type) of avatar stamps provided to the user varies during the above-mentioned registration period, voting period, and result announcement period. FIG. 11 is a table illustrating the correlation between the time period and the usable avatar stamps. As shown in the table, in the registration period during which the registration of avatar images is accepted, only the official avatar stamp is provided and can be used. This official avatar stamp is an avatar stamp that corresponds to an avatar image created by the contest operator. An avatar image corresponding to an official avatar stamp is also configured as an image in which an arbitrary text string is inputted to an image in which one or more items have been set for an avatar main body, just as with an avatar image registered by a general user.

Also, in the voting period during which votes for registered avatar images are accepted, as shown in FIG. 11, in addition to the official avatar stamp, a custom avatar stamp corresponding to an avatar image created and registered by the user himself is provided and can be used. Also, in the result announcement period during which the ranking is presented on the ranking screen 90, in addition to the official avatar stamp and the custom avatar stamp, avatar images with a high ranking (such those in first to tenth places) are provided and can be used.

Figure 12:
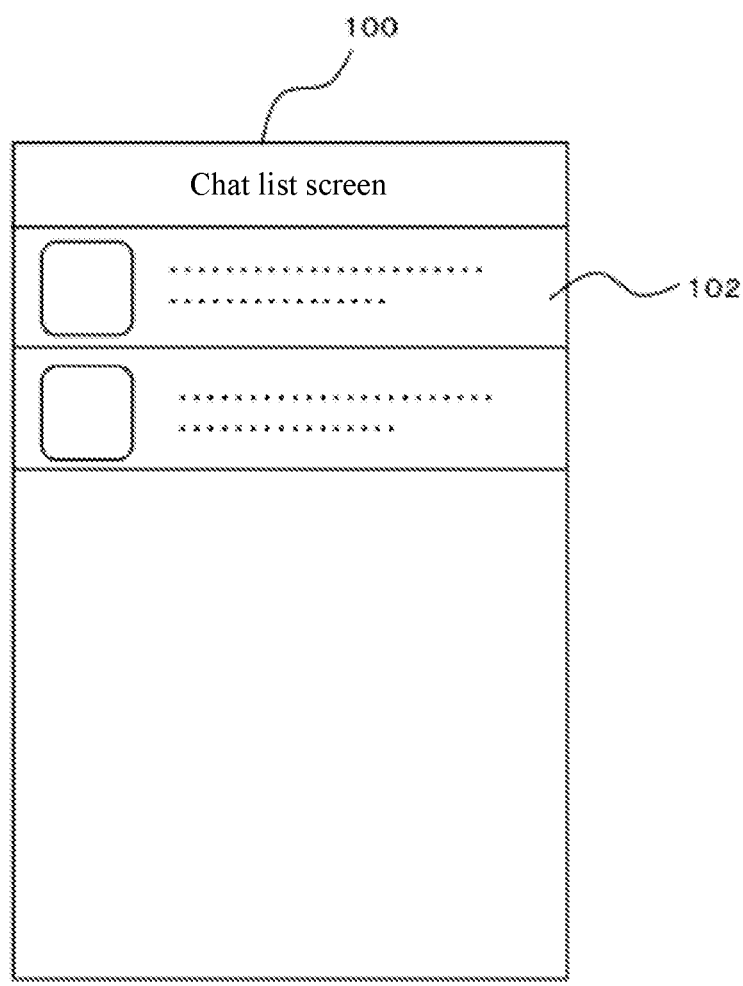
FIG. 12 illustrates a diagram showing an example of a chat list screen 100.

In this example, an avatar stamp is a stamp that can be used as a message in the chat service provided by the system 10. An avatar stamp is provided through a function in the chat service. FIG. 12 shows an example of a chat list screen 100 in a chat service. On the screen 100, individual display areas 102 corresponding to individual chat rooms are arranged vertically.

Figure 13:
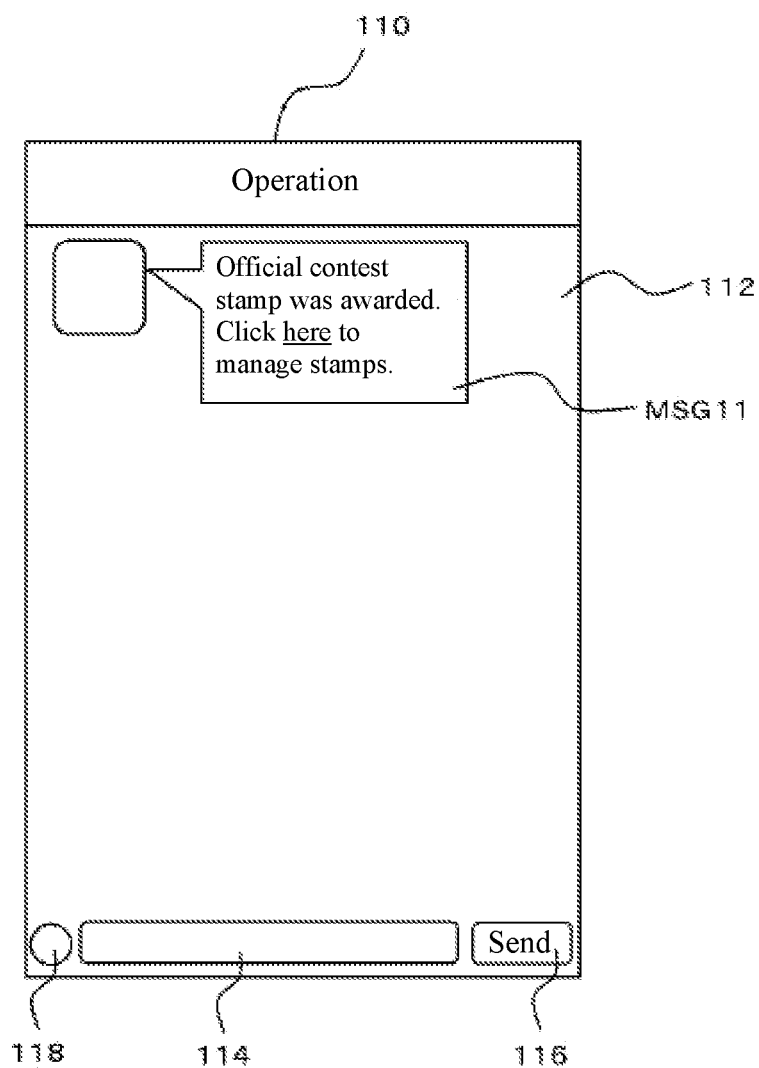
FIG. 13 illustrates a diagram showing an example of a chat screen 110.

When one of the individual display areas 102 displayed on the chat list screen 100 is selected, the chat screen 110 shown in FIG. 13 is displayed for performing text chatting in the corresponding chat room. As shown in the drawing, the chat screen 110 has a message display area 112 in which sent chat messages are arranged vertically in chronological order, a message input area 114 for inputting messages, a send button 116 for sending a message inputted in the message input area 114, and a stamp button 118 for sending a stamp as a message.

Here, the chat screen 110 in FIG. 13 corresponds to a chat room with the operation account managed by the operator of the avatar image contest. In this example, when a user registers an avatar image during the above-mentioned registration period, the message MSG11 in FIG. 13 is sent from the operation account to the user. This message MSG11 is a message that notifies the user that the above-mentioned official avatar stamp has been provided. The user can put the official avatar stamp in a usable state through the stamp management function indicated by this message MSG11.

Figure 14:
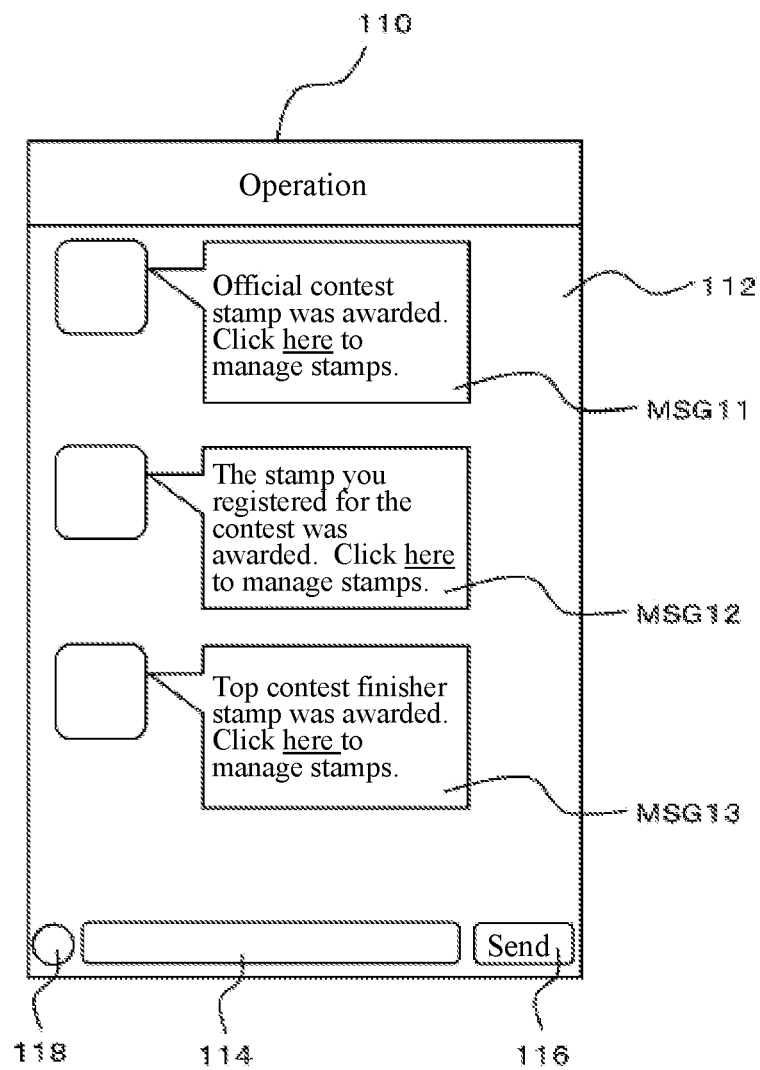
FIG. 14 illustrates a diagram showing an example of the chat screen 110.

FIG. 14 shows the chat screen 110 in a state in which a message MSG12 notifying that the above-mentioned custom avatar stamp has been provided to the user from the state of the chat screen 110 of FIG. 13 is transmitted from the operation account, after which a message MSG13 notifying that the above-mentioned high-ranking top avatar stamps have been provided is transmitted from the operation account. The message MSG12 notifying that a custom avatar stamp has been provided is transmitted at a specific point within the voting period (such as on the first day of the period). Similarly, the message MSG13 notifying that the high-ranking avatar stamps have been provided is transmitted at a specific point within the result announcement period (such as on the first day of the period). Thus, in this example, in each of the registration period, the voting period, and the result announcement period, the provision of an avatar stamp is notified via a chat message from the operation account.

Figure 15:
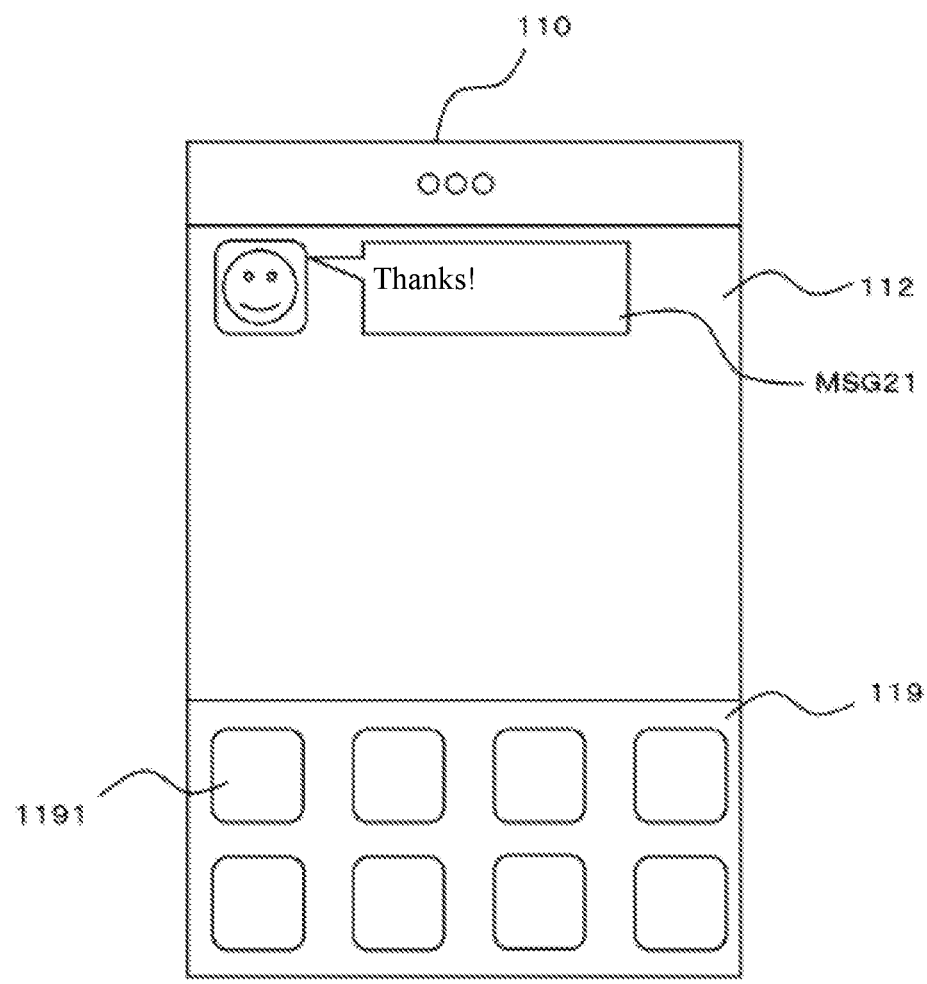
FIG. 15 illustrates a diagram showing another example of the chat screen 110.

Just as with a normal stamp, the avatar stamp thus provided can be used (transmitted) as a chat message in a chat service. FIG. 15 shows another example of the chat screen 110. In the chat screen 110 shown in FIG. 15, a message MSG21 of "Thanks!" from another user is displayed in the message display area 112, and a stamp display area 119 is displayed in which a plurality of usable stamps 1191 are arranged in columns and rows. The display of this area 119 is expanded according to the selection of the stamp button 118 on the chat screen 110 described above. The user can select any stamp including an avatar stamp from among the stamps 1191 arranged in the area 119, and transmit the stamp as a message.

Figure 16:
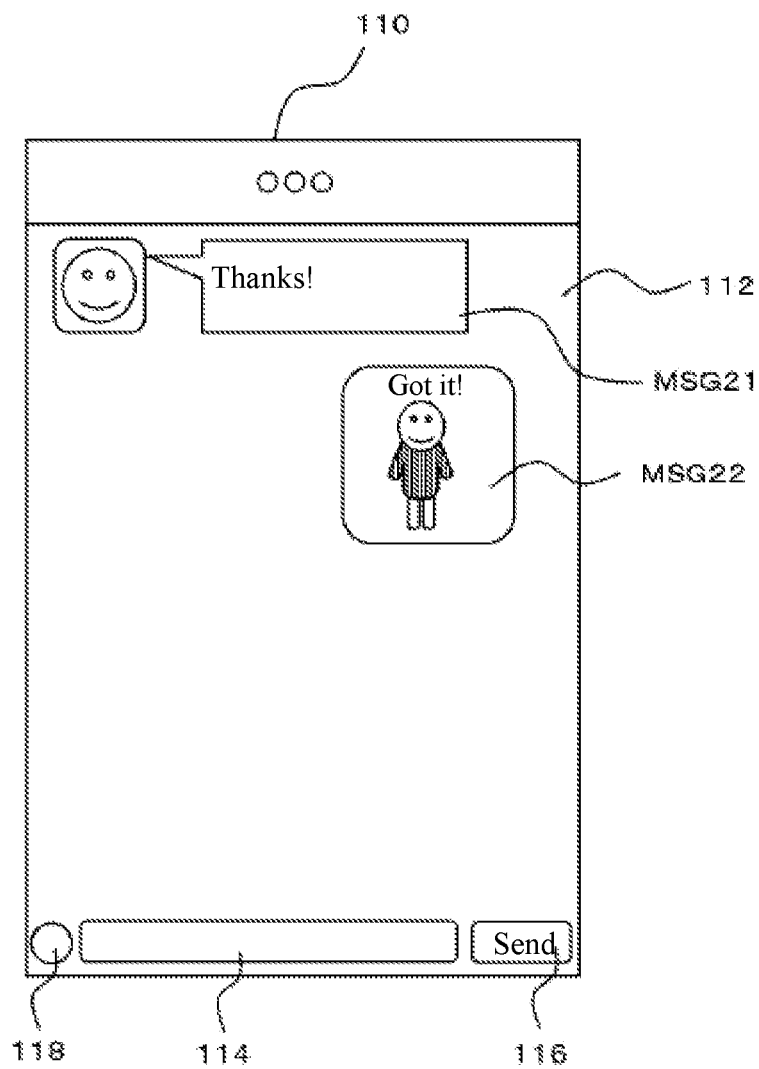
FIG. 16 illustrates a diagram showing an example of the chat screen 110 in a state in which an avatar stamp has been transmitted.
Figure 17:
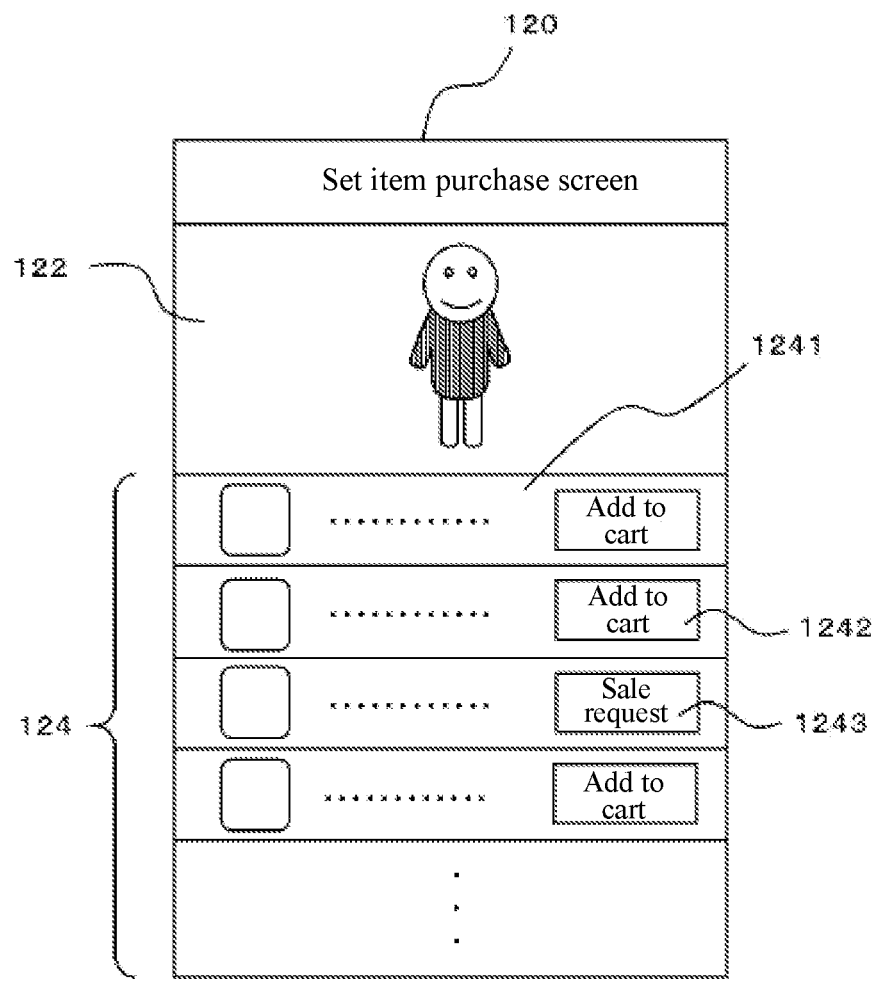
FIG. 17 illustrates a diagram showing an example of a set item purchase screen 120.

FIG. 16 shows an example of the chat screen 110 in a state in which an avatar stamp has been transmitted as a message MSG22. In this example, the avatar stamp has the same appearance as the corresponding avatar image. Here, the chat screen 110 is configured so that when the avatar stamp displayed in the message display area 112 (that is, the avatar stamp transmitted as a message) is selected, the set item purchase screen 120 shown in FIG. 17 is called up. As shown in the drawing, the set item purchase screen 120 has an avatar image display area 122 in which the corresponding avatar image is displayed, and an item list display area 124 in which a list of the items set in the avatar image is displayed. The input text string is omitted from (not displayed in) the avatar image displayed in the avatar image display area 122 of this screen 120. In the item list display area 124, individual display areas 1241 for displaying information related to individual items are arranged vertically.

As shown in FIG. 17, an individual display area 1241 displays information related to an item (an image, a description, etc.). In this area 1241, either a first button 1242 displayed as "Add to cart" or a second button 1243 displayed as "Sale request" is disposed. The first button 1242 is disposed when the corresponding item is not for sale and is a button for putting the item in a virtual shopping cart. The procedure for purchasing an item placed in the cart is performed on a subsequent screen. Also, the second button 1243 is disposed when the corresponding item is not for sale and is a button for making a sale request for that item. When the second button 1243 is selected, the number of sale requests in the item management table 412 is updated (increased by one) for the corresponding item.

In this manner, a user who has transmitted or received an avatar stamp can purchase an item set for the corresponding avatar image via the set item purchase screen 120. Then, the purchased item can be set for the avatar main body in an avatar image for normal use, which is different from an avatar image used for a contest. A normal avatar image is displayed as the user's alter ego on various screens, including the user's profile screen. This configuration stimulates the user's use of avatar stamps corresponding to avatar images including items of interest, and promotes the purchase of items.

In the above example, the ranking of the avatar images is set and presented, but in addition to the ranking of avatar images, the ranking of items may also be set and presented. In this case, for example, the items are ranked according to item points, and the ranking is presented to the user via the screen corresponding to the above-mentioned ranking screen 90. In this case, this screen can be configured so as to allow sale requests and the purchase of items having higher rankings.

In the above example, the number of posts to a specific SNS associated with an avatar image is managed, and the more posts there are, the more specific addition points are added to the avatar image point total, but in addition to or instead of the number of posts to a specific SNS, the number of times a post is shared on a specific SNS may be managed, and a specific number of addition points based on these shares may be added. In this case, the system 10 is configured to acquire the number of shares of posts to a specific SNS from other systems providing that SNS, for example.

In the above example, the avatar stamps having higher rankings (such as those from first to tenth place) were provided to a plurality of users, but the appearance of the avatar stamps may also be changed on the basis of the order in the ranking (for example, avatar stamps corresponding to the avatar images in first to third place may be given a special visual effect to the avatar image). Another embodiment, for example, may be configured such that the appearance of a custom avatar stamp is changed on the basis of at least the ranking of the avatar images registered by the user himself (that is, the avatar image points).

In the above example, the avatar stamp was configured to be usable as a chat message in a chat service, but the configuration may also be such that the avatar stamp can be used as a message in a bulletin board (group) used only by specific participating members, in addition to or instead of a chat service.

The contest providing system 10 according to this embodiment described above accepts evaluations (such as "likes") for a registered avatar image, while providing avatar stamps corresponding to the avatar images on the basis of at least this evaluation. Therefore, even after the contest in which the avatar images are evaluated has ended, the user can continue to enjoy the use of the corresponding avatar stamp provided on the basis of this evaluation. Thus, this embodiment of the present invention promotes continued use of an avatar image registered in a contest or the like.

In this embodiment, the system 10 provided a specific communication service such as chat, but in another embodiment of the present invention, the specific communication service can be provided by a system other than the system 10. That is, the avatar stamp in an embodiment of the present invention includes stamps that can be used in a chat service or the like provided by a system other than the system 10.

The processing and procedures described in this Specification may be implemented by software, hardware, or any combination thereof, besides what was explicitly described above. For example, the processing and procedures described in this Specification may be implemented by installing logic corresponding to the processing and procedures in a medium such as an integrated circuit, volatile memory, nonvolatile memory, magnetic disk, or the like. Also, the processing and procedures described in this Specification can be implemented as computer programs (e.g., non-transitory computer-readable medium including instructions to be performed on a processor) corresponding to the processing and procedures, and can be executed by various kinds of computer.

Although the processing and procedures described in this Specification are described as being executed by a single device, software, component, or module, such processing or procedures may be performed by multiple devices, multiple pieces of software, multiple components, and/or multiple modules. Also, the software and hardware elements described in this Specification can be realized by consolidating them into fewer elements, or by breaking them up into more components.

In this Specification, whether the constituent elements of the invention are described as being either singular or plural, or whether the description does not limit to either singular or plural, the constituent elements may be either singular or plural, except when it should be understood otherwise from the context.

DESCRIPTION OF THE REFERENCE NUMERALS

10 contest providing system
20 network
30 user terminal
41 information storage and management component
43 avatar image manager
45 avatar stamp provider
47 communication controller
50 outfit changing screen
60 text input screen
70 voting screen
80 individual display screen
90 ranking screen
100 chat list screen
110 chat screen
120 set item purchase screen

The invention claimed is:

1. A system for managing the evaluation of avatar images, wherein the system comprises:
   one or more computer processors; and
   one or more software modules that are configured to, when executed by the one or more computer processors,
      register a plurality of avatar images from a plurality of users,
      generate a graphical user interface through which users vote for one or more of the plurality of avatar images,
      determine a score for each of the plurality of avatar images based on the votes, and,
      for each of one or more of the plurality of avatar images having a highest score, make an avatar image object, corresponding to that avatar image, available to one or more users for use in a communication.

2. The system according to claim 1, wherein the voting occurs during a first time period, and wherein each avatar image object is made available in a second time period after the first time period.

3. The system according to claim 1, wherein registering a plurality of avatar images comprises, from each of the plurality of users, receiving a selection of an avatar main body and receiving a selection of one or more items to be added to the avatar main body.

4. The system according to claim 3, wherein the one or more software modules are further configured to, in response to selection of an avatar image object displayed in a communication, provide a second graphical user interface for obtaining the one or more items that were added to the avatar main body of the avatar image to which the avatar image object corresponds.

5. The system according to claim 4, wherein the second graphical user interface comprises one or more inputs for requesting any of the one or more items that are not for sale.

6. The system according to claim 3, wherein determining the score for each of the plurality of avatar images is further based on a number of the plurality of avatar images having a same item added to the avatar main body.

7. The system according to claim 3, wherein the one or more software modules are further configured to determine a score for each item that has been added to an avatar main body based on at least the scores for the avatar images to which that item has been added.

8. The system according to claim 1, wherein determining the score for each of the plurality of avatar images is further based on a number of posts to a specific SNS associated with each registered avatar image.

9. A method for managing the evaluation of an avatar image, which is executed by one or more computers, said method comprising:
   registering a plurality of avatar images from a plurality of users;
   generating a graphical user interface through which users vote for one or more of the plurality of avatar images;
   determine a score for each of the plurality of avatar images based on the votes; and,
   for each of one or more of the plurality of avatar images having a highest score, making an avatar image object, corresponding to that avatar image, available to one or more users for use in a communication.

10. A non-transitory computer-readable medium including instructions to be performed on a processor for managing the evaluation of an avatar image, the instructions comprising:
   registering a plurality of avatar images from a plurality of users;
   generating a graphical user interface through which users vote for one or more of the plurality of avatar images;
   determining a score for each of the plurality of avatar images based on the votes; and,
   for each of one or more of the plurality of avatar images having a highest score, making an avatar image object, corresponding to that avatar image, available to one or more users for use in a communication.

* * * * *